Figure 4:
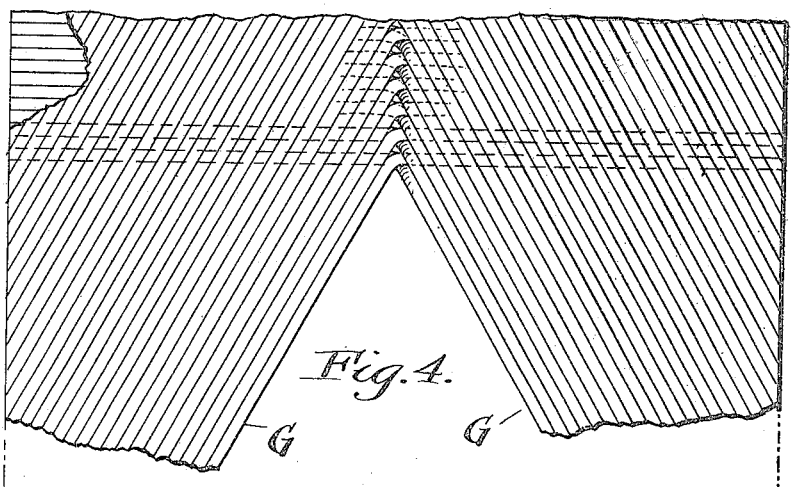

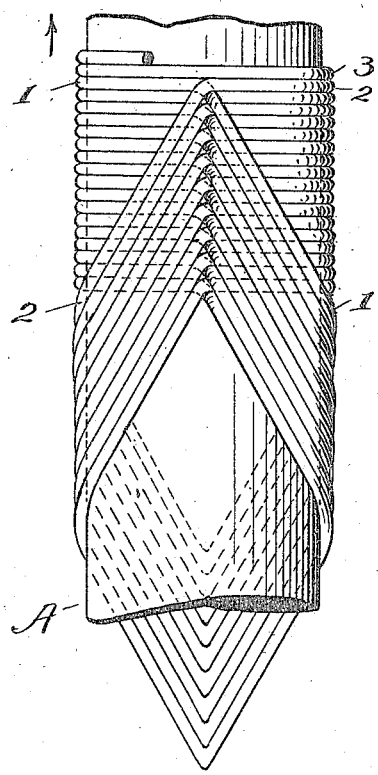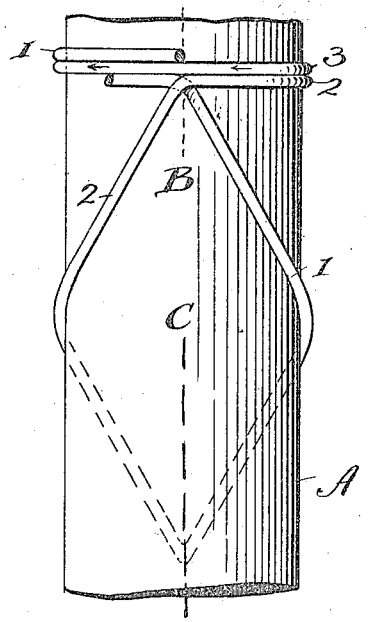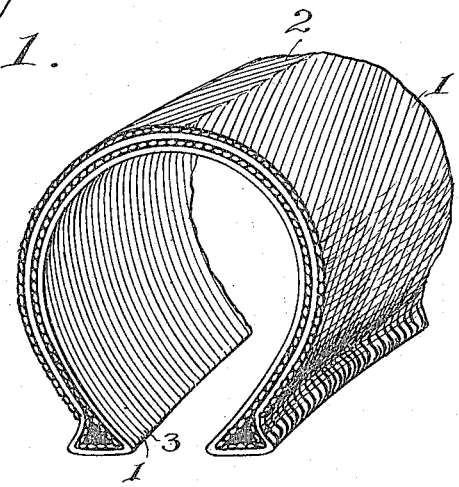

J. F. IVES.
TIRE FABRIC.
APPLICATION FILED JAN. 8, 1914. RENEWED JAN. 26, 1916.

1,194,388.

Patented Aug. 15, 1916.
4 SHEETS—SHEET 3.

Witnesses
E. B. Felchies
L. I. Porter

Inventor
John F. Ives
by Thurston & Kivis
Attorney

UNITED STATES PATENT OFFICE.

JOHN F. IVES, OF CLEVELAND, OHIO.

TIRE FABRIC.

1,194,388.  Specification of Letters Patent.  Patented Aug. 15, 1916.

Application filed January 8, 1914, Serial No. 810,942. Renewed January 26, 1916. Serial No. 74,476.

*To all whom it may concern:*

Be it known that I, JOHN F. IVES, a citizen of the United States, residing at Cleveland, in the county of Cuyahoga and State of Ohio, have invented a certain new and useful Improvement in Tire Fabric, of which the following is a full, clear, and exact description.

This invention relates to what are known as cord tires,—that is to say, tires in which the commonly used bias-cut strips of friction fabric are replaced by layers formed of rubber coated cords laid substantially in contact side by side.

The use of cord tires is confined almost entirely to automobiles; and they are generally conceded to be more resilient, more durable, and faster when so used than are the old style fabric tires. When it is said that a cord tire is faster than an old style tire it is meant when such cord tire is used on an automobile, for example, said automobile will travel faster with a given expenditure of power than it would if it were equipped with the old style tire. Notwithstanding their recognized advantages, the cord tires as heretofore made are very much more expensive to make than are the old style fabric tires, and for this reason have not gone into very general use.

The object of this invention is to produce, at a much reduced cost, a cord tire which will have, in an even greater degree than cord tires as they have heretofore been made, the qualities of resiliency, durability and fastness.

The invention consists partly in a cord tire fabric having characteristics which are hereinafter described and are shown in the drawings and definitely defined by the appended claims.

Also the invention consists partly in the manner of winding cord continuously in the same circumferential direction upon a mandrel to produce a cord tube, which, when split, constitutes the above mentioned fabric.

Figure 5:
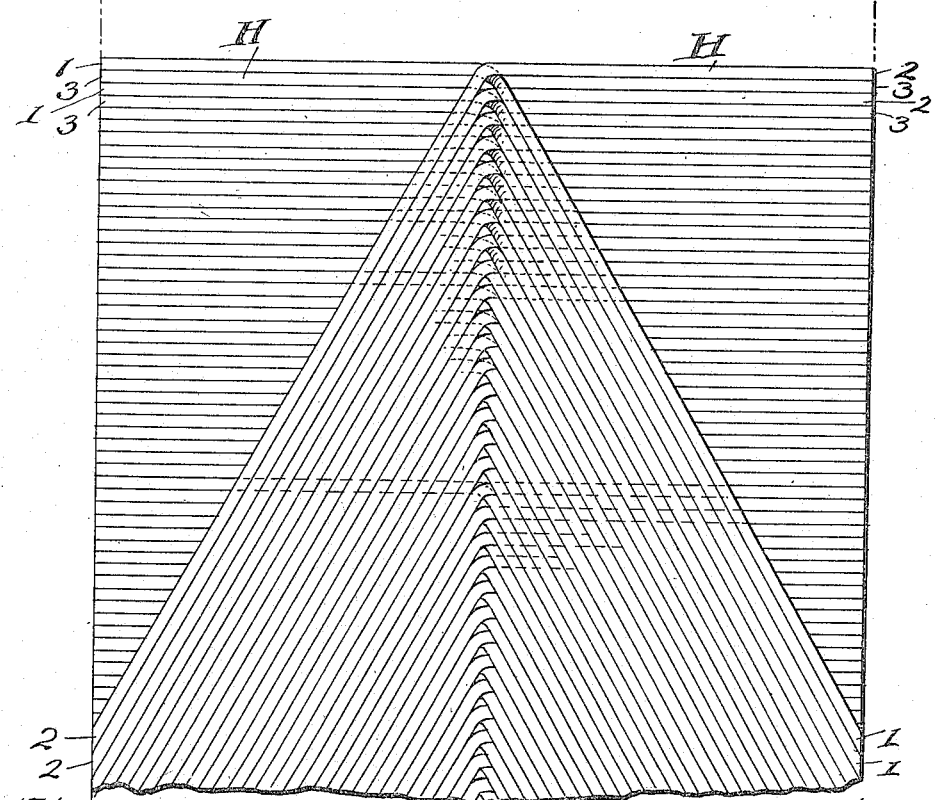
Figure 6:
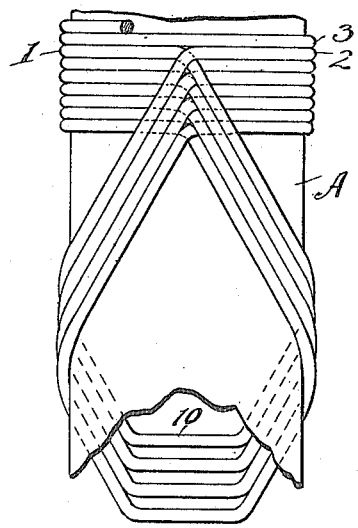
Figure 7:
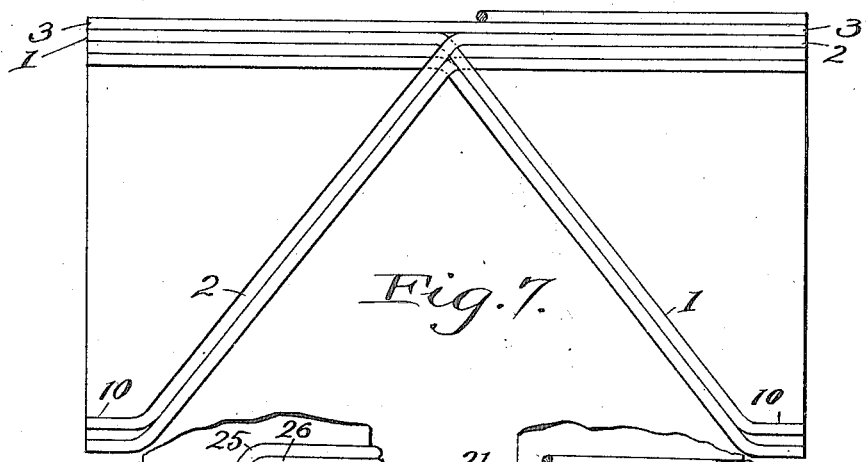
Figure 8:
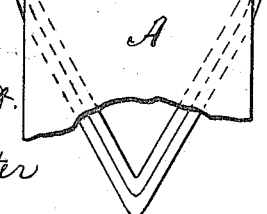
Figure 9:
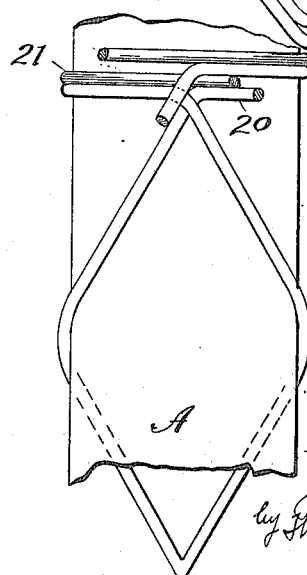
Figure 10:
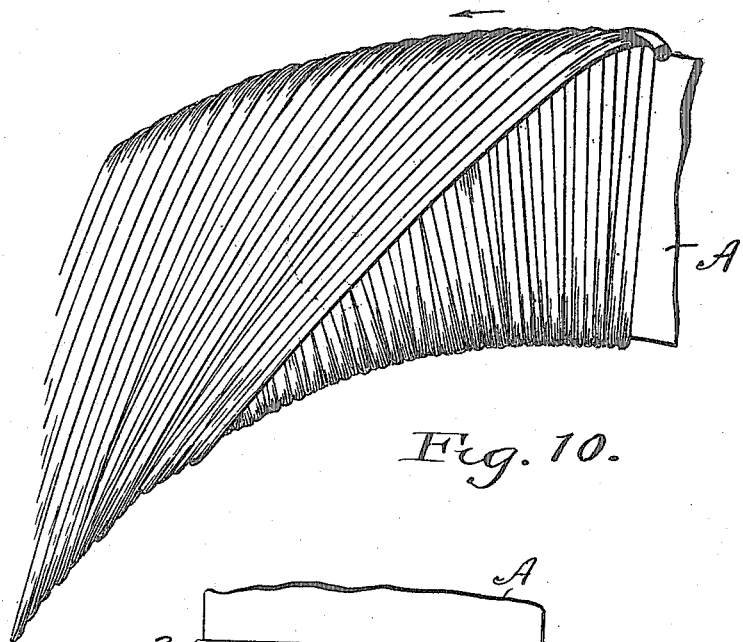
Figure 11:
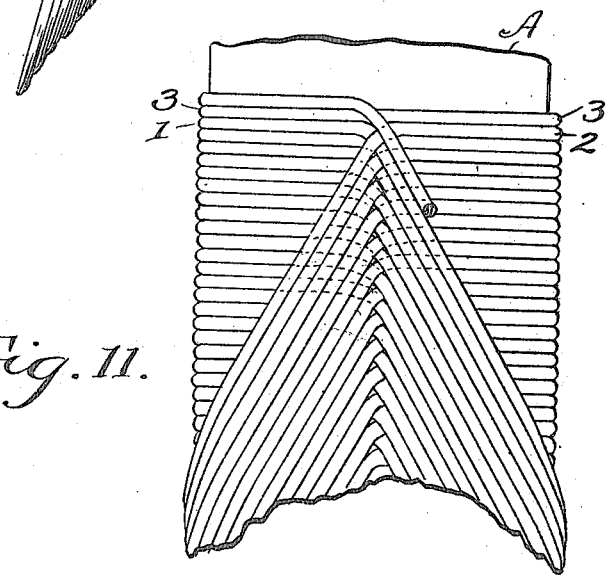

In the drawing, Figure 1 is a view of a part of a mandrel and of a cord wound thereon, so as to produce a short length of the peculiar tube from which the said cord tire fabric is made by splitting the tube. Fig. 2 is a similar view of a part of a mandrel on which is wound one complete cycle of windings by which the fabric tube is produced. Fig. 3 is a perspective view of a piece of a tire casing made of two layers of the described two ply fabric. Fig. 4 is a plan view of one end, partly broken away, of the fabric produced by winding a cord upon a mandrel, and then splitting and flattening the produced tube. The end shown in this figure is that end from which the winding proceeds. Fig. 5 is a plan view of that end of a similar strip at which the winding of the cord terminates. Fig. 6 is a view of a part of a mandrel and a cord wound thereon in a slightly different direction near the "edge line" from that shown in Figs. 1 and 2; and Fig. 7 is a plan view of the strip made by splitting and flattening the tube shown in Fig. 6. Fig. 8 is a view of a mandrel on which two cords laid side by side are wound through one complete cycle, such as is shown in Fig. 2, in a manner such as will produce substantially the same tube as is produced by winding one cord, as shown in Fig. 2. Fig. 9 is a view of a mandrel on which two cords may be wound, each through one complete cycle,— which cycles differ from each other to produce substantially the same tube which is produced by winding one cord, as shown in Fig. 2, or two cords as shown in Fig. 8. Fig. 10 is a side view of a part of an annular mandrel on which a single cord is wound in substantially the same tube; and Fig. 11 is a top plan view of the tire and mandrel section shown in Fig. 10.

In producing the fabric, a mandrel A is required which may have any desired cross sectional configuration, although, preferably, it should be nearly cylindrical; and it may be straight, spiral or annular. Upon this mandrel the cord is wound continuously in one general direction;—that is to say, either clockwise or the reverse, as desired. Whether the windings are produced by turning the mandrel or by carrying the cord around the mandrel is a matter of no consequence.

On Fig. 2 two dotted lines B and C are drawn. They are parallel with the axis of the mandrel and are placed 180° apart. The line B made with the short dots will be called for convenience the tread line. The line C made of long dots will be called for convenience the edge line. The cord is wound about the mandrel in substantially the following manner, to wit: Starting with the tread line the cord is carried in a diagonal direction around to the edge line, departing from the tread line at an angle of very nearly 30°, and approaching the edge line at substantially the same angle. Then the cord is bent so as to depart from the edge line at an angle of about 30°, and is carried around to the starting point on the tread line, which it meets at substantially the same angle. The cord is then passed over the first laid cord at the tread line, and is then carried twice around the mandrel in a slightly spiral direction, but as nearly as possible at right angles to both the edge line and tread line. These circumferential windings are laid in substantial contact with each other. This completes the cycle; and this cycle is repeated indefinitely until the produced tube is of the required length. The tube lengthens in the direction indicated by the arrow adjacent to Fig. 1. The result of this continued repetition of the winding cycle referred to is the production of a tube, composed of two superposed layers, of which the inner layer comprises cord stretches which are in contact and extend in directions substantially at right angles to both the edge and tread lines. The outer layer is composed of cord stretches which extend divergingly from the tread line at substantially the same angle thereto, and in the same general direction lengthwise of the mandrel toward the edge line. This tube may be utilized as a tube in making a tire. If it is not thick enough, a second tube may be formed upon the first by similarly winding a cord thereon. If, however, one wishes to make the more commonly used tire casings, the next step after the formation of the two ply tube described is to split said tube lengthwise along what has been termed the edge line. This will produce such a two ply cord fabric as is shown in Figs. 4 and 5, of the drawing. By consulting Fig. 5, it will be seen that this fabric is formed of three series of cords which occupy definite relations to one another. First, there is a cord of one series marked 1, which extends from the left edge of the fabric strip at right angles to said edge up to the tread line, and thence toward the right edge line in a direction such that it departs from the tread line at an angle of about 30°. Then comes a cord of the second series, said cord being indicated by 2. This cord extends from the right edge line to the tread line at substantially right angles to both of these lines, and in alinement with a similar part of the previously mentioned cord 1. At the tread line this cord 2 crosses cord 1 and then extends to the left edge line in a direction such that it departs from the tread line at an angle of about 30° and approaches the tread line at about the same angle. Next comes a cord of the third series, which extends from one edge line to the other at substantially right angles to both. This cord which is marked 3, lies in contact with the transversely extended parts of both of the previously mentioned cords 1 and 2, and lies under the diagonal parts of said cords. These three cords, one from each series, constitutes a group; and the fabric is made up by repetitions of these groups.

The diagonally disposed stretches of each cord 1 lies in contact with the last laid corresponding diagonal stretch of a similar cord 1. The diagonal part of each cord 2 lies in contact with the diagonal part of the last previously laid cord 2. It will also be perceived that these groups of cords, one from each series, laid down in the manner stated, produces a two ply fabric. All of the diverging diagonal parts of cords 1 and 2 are superposed upon the transversely extended cords 3 and the transversely extended parts of cords 1 and 2. Looking at the outer side of the fabric and excepting only the last finished end thereof, we see nothing but the diverging diagonal cords. Looking at the inner side of the fabric and excepting the end at which the making of the fabric was begun, we see nothing but the transversely extended cords. At the end at which the making of the fabric was begun there is on each side a triangular portion G made up of the diagonally disposed cords only,— which diagonal cords are not underlaid by any transversely extended cords, as appears from Fig. 4, wherein the transversely extended cords are indicated by dotted lines. At the end at which the fabric is finished and on each side of the strip is a triangular portion H formed only of the transversely extended cords which are not overlaid by the diagonally extended cords.

When the described fabric is used for making a tire casing, it is placed upon an annular core, just as the friction fabric is in the making of the old style tire casings, and the edges of this strip are stitched down against the core in the familiar way. When the two ends of the fabric are brought together these ends are not overlapped in the ordinary sense. What happens is that the transversely extended cords at one end are brought into contact with the transversely extended cords of the other end; and this leaves the single ply triangular parts G, made up of diagonal cords, to be laid upon single ply parts H of the other end which are made up of transversely extended cords. This causes the first diagonal cords laid down to come into contact with the last diagonal cords laid down in the making of the fabric, and makes an annular casing which has not discoverable lapped joint.

Those familiar with this art will understand that the cords which are wound upon the mandrel to form the tube and fabric described will be impregnated and coated with a suitable sticky rubber composition, by reason of which the cords, when laid in substantial contact, will stick together, so that subsequently the produced tire may be vulcanized, whereby the cords will be held permanently in the described relationship.

The winding of the cord as shown in Fig. 6 is precisely as shown in Figs. 1 and 2, except that the diagonal stretches extending in opposite directions from the tread line, are not continued in the diagonal direction entirely to the edge line, but stop short of the same; and that between the parts of these diagonal stretches adjacent to the edge line, the cord, as at 10, is wound in a direction at right angles to said edge line. When so winding the cord, the cord stretches 10 will not be laid in contact,—but will be separated a distance about equal to the thickness of the cord,—whereby these cord stretches 10 will be of the same length at all times.

When a tube wound as shown in Fig. 6 is split, it is split along the edge line, i. e. a longitudinal line 180° from the tread line. The resulting strip will be like that first described, except that the outer layer close to both edges will be composed of right angle cords which do not touch each other. The fact that the cords do not touch along the edges of the strip is of some advantage in that it facilitates the stitching in of the strips on an annular mandrel for forming a tire casing.

It is apparent that instead of using a single cord, two or more cords may be laid together side by side in the manner before explained, and as illustrated in Fig. 8. It is possible also to produce the described tube by using two cords wound in the manner illustrated in Fig. 9. One cord 20 is wound from the tread line diagonally half way around to the core, and then diagonally back to the tread line, and then once around the core. The other cord 21 will be wound spirally around the core always in substantial contact with the transverse stretches of cord 20.

In Fig. 10 is shown a short section of an annular mandrel on which a single rubber coated cord is wound continuously in the same direction in the manner shown in Fig. 2, and heretofore described, to form the tubular annulus. When a tubular fabric is formed on an annular mandrel, the cord stretches at and near the inner periphery of said mandrel will necessarily overlap one another, and in a more or less haphazard way. This is because the circumference of the inner part of this annular mandrel is less than the circumference of the outer part of said mandrel, and because the cord stretches, as they pass around the outer part of the mandrel, should be in substantial contact. The stated overlapping of the cord stretches is not objectionable, however. Indeed, when a strip of fabric wound on a straight mandrel, as shown in Fig. 2 is "stitched in" on an annular tire core to form a tire casing, the cord stretches at and near the edges of the strip will be caused to overlap more or less by the stitching-in action.

When a tire casing, constructed as hereinbefore described, is applied to a wheel, it should be so applied that the V-shaped opening between the diagonal cords at the tread of the wheel, shall point forward in the direction in which the wheel turns. In other words, the part of the tire below the axis of the wheel should be moving in the direction such that the open angle between the cords is moving rearward. When the described tire is so applied and used, two very desirable practical results are attained. In the first place, the reaction of the tire upon the ground, due to the fact that the tire is necessarily distorted at the point where it touches the ground by the sustained weight, is such as to impart to the wheel a tendency to turn in the driving direction. This may be easily demonstrated by dropping a wheel having on it an inflated tire, constructed as herein described. When such wheel rebounds, it will turn and jump forward always in the same direction and a very substantial distance. That is to say, the wheel will turn in the direction it would turn in if applied to a vehicle going in the direction in which the wheel bounds.

The second advantage of applying the tire in the manner stated is that the driving strains applied to the tire from the rim of the wheel are applied by pulling on the diagonal cords, the pull being applied to the parts of the cord which are engaging with the rim. If the tire were applied in the other way, these driving strains applied to the tire from the rim would be applied by pushing against the ends of those cords which are secured in the rim. The diagonal cords take the driving strains, and the transverse cords take the bursting strains incident to using the tire.

Having described my invention, I claim:

1. A cord tube formed of a continuous cord coated with a sticky rubber compound, which tube comprises an inner layer of transversely extended cords and a superimposed outer layer of cords which extend from the tread line divergingly around to or near to a parallel line 180° removed from the tread line.

2. A cord fabric tube composed of two layers of contacting rubber coated cord windings, the inner layer comprising cords lying in planes which are substantially at right angles to the axis of the tube, and the overlying layer comprising cords which extend from the tread line diagonally half way around the tube, and then diagonally back to the said tread line.

In testimony whereof, I hereunto affix my signature in the presence of two witnesses.

JOHN F. IVES.

Witnesses:
 E. B. GILCHRIST,
 E. L. THURSTON.